United States Patent
Yang et al.

(10) Patent No.: US 9,626,780 B1
(45) Date of Patent: Apr. 18, 2017

(54) VISUALIZING TRANSACTIONS OF A TRANSACTION-BASED SYSTEM

(71) Applicant: Xilinx, Inc., San Jose, CA (US)

(72) Inventors: Yi-Hua E. Yang, San Jose, CA (US); Patrick Lysaght, Los Gatos, CA (US); Paul R. Schumacher, Berthoud, CO (US); Graham F. Schelle, Longmont, CO (US)

(73) Assignee: XILINX, INC., San Jose, CA (US)

( * ) Notice: Subject to any disclaimer, the term of this patent is extended or adjusted under 35 U.S.C. 154(b) by 214 days.

(21) Appl. No.: 14/312,616

(22) Filed: Jun. 23, 2014

(51) Int. Cl.
*G06T 11/20* (2006.01)

(52) U.S. Cl.
CPC .......... *G06T 11/206* (2013.01); *G06T 11/203* (2013.01)

(58) Field of Classification Search
CPC .............................. G06T 11/203; G06T 11/206
See application file for complete search history.

(56) References Cited

U.S. PATENT DOCUMENTS

2005/0162423 A1* 7/2005 Goggin ................. G06T 11/206 345/440
2006/0010418 A1* 1/2006 Gupta ................ G06Q 10/0631 717/101

OTHER PUBLICATIONS

U.S. Appl. No. 14/278,263, filed May 15, 2014, Schumacher et al.

* cited by examiner

*Primary Examiner* — Matthew Salvucci
(74) *Attorney, Agent, or Firm* — Kevin T. Cuenot

(57) ABSTRACT

Visualizing transactions in a transaction-based system includes displaying, on a display device, an x-y coordinate system including an x-axis and a y-axis, wherein the x-axis is demarcated in units of time and the y-axis is demarcated according to a transaction characteristic and formatting, using a processor, each of a plurality of transactions of a transaction system as a line having a start end representing a start of the transaction and a terminating end representing an end of the transaction. For each line representing a transaction, the start end of the line is located at a first x-coordinate corresponding to a start time of the transaction and a first y-coordinate of zero. For each line, the terminating end of the line is located at a second x-coordinate corresponding to an end time of the transaction and a second non-zero y-coordinate that is the same for each line. Each line is displayed on the display device using the processor in combination with the x-y coordinate system.

17 Claims, 7 Drawing Sheets

VISUALIZING TRANSACTIONS OF A TRANSACTION-BASED SYSTEM

FIELD OF THE INVENTION

This disclosure relates to visualizing transactions of a transaction-based system.

BACKGROUND

Many systems utilize an architecture where requesting entities issue requests for service. Each request is processed using available resources of the system. The system responds to each received request by applying resources to provide the requesting entity with a response or otherwise process the received request. As the number of requests received by the system increases, the system may experience congestion when requests are received by the system and resources are not available to service the requests.

In some systems, the requests may be queued or stored within one or more queues in an effort to efficiently service each request. In other systems, a request may incur an early response message indicating unavailability of service for the request. In still other cases, a request may be dropped silently without any response, thereby allowing the sender to timeout and resubmit the same request.

In cases where requests are queued, the requests remain queued while waiting for resources of the system to become available. This type of architecture is used in many transaction-based systems. Transaction-based systems include a variety of different system types such as, for example, queuing systems, communication systems, information processing systems, and the like. More specific examples of transaction-based systems include, but are not limited to, client-server systems, processor systems, offload processing systems, memory management systems, database systems, telephony systems, and warehouse management systems.

SUMMARY

A method includes displaying, on a display device, an x-y coordinate system having an x-axis and a y-axis, wherein the x-axis is demarcated in units of time and the y-axis is demarcated according to a transaction characteristic, formatting, using a processor, each of a plurality of transactions of a transaction-based system as a line having a start end representing a start of the transaction and a terminating end representing an end of the transaction. The method includes, for each line representing a transaction, locating the start end of the line at a first x-coordinate corresponding to a start time of the transaction and a first y-coordinate of zero. The method further includes, for each line, locating the terminating end of the line at a second x-coordinate corresponding to an end time of the transaction and a second non-zero y-coordinate that is the same for each line. Each line is displayed on the display device using the processor in combination with the x-y coordinate system.

A system includes a display device and a processor coupled to the display device. The processor is programmed to initiate executable operations that include displaying, on a display device, an x-y coordinate system having an x-axis and a y-axis, wherein the x-axis is demarcated in units of time and the y-axis is demarcated according to a transaction characteristic, formatting, using a processor, each of a plurality of transactions of a transaction-based system as a line having a start end representing a start of the transaction and a terminating end representing an end of the transaction. The executable operations include, for each line representing a transaction, locating the start end of the line at a first x-coordinate corresponding to a start time of the transaction and a first y-coordinate of zero. The executable operations further include, for each line, locating the terminating end of the line at a second x-coordinate corresponding to an end time of the transaction and a second non-zero y-coordinate that is the same for each line. Each line is displayed on the display device using the processor in combination with the x-y coordinate system.

A non-transitory computer-readable medium has instructions stored thereon which, when executed by a processor, perform a method. The method includes displaying, on a display device, an x-y coordinate system having an x-axis and a y-axis, wherein the x-axis is demarcated in units of time and the y-axis is demarcated according to a transaction characteristic, formatting, using a processor, each of a plurality of transactions of a transaction-based system as a line having a start end representing a start of the transaction and a terminating end representing an end of the transaction. The method includes, for each line representing a transaction, locating the start end of the line at a first x-coordinate corresponding to a start time of the transaction and a first y-coordinate of zero. The method further includes, for each line, locating the terminating end of the line at a second x-coordinate corresponding to an end time of the transaction and a second non-zero y-coordinate that is the same for each line. Each line is displayed on the display device using the processor in combination with the x-y coordinate system.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION OF THE DRAWINGS

Figure 1:
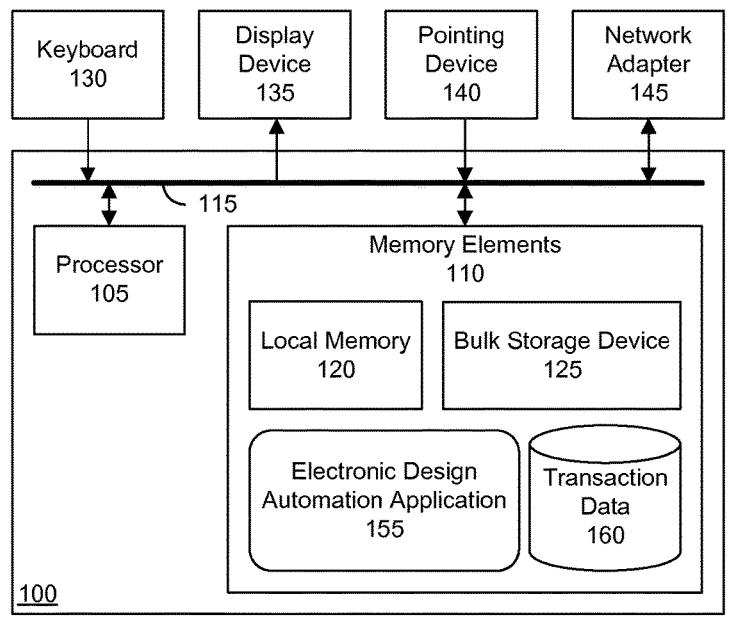
FIG. 1 is a block diagram illustrating an exemplary data processing system (system).

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to visualizing transactions of a transaction-based system. In accordance with the inventive arrangements described herein, transactions of a transaction-based system are displayed using a two-dimensional (2D) coordinate system. The horizontal axis of the coordinate system represents time. The vertical axis of the coordinate system may be demarcated using any one of a plurality of different units. Further, different portions of the y-axis may be demarcated using different units for each of the different portions of the y-axis concurrently. One or more transactions may be represented on the 2D coordinate system using lines. Each transaction is represented by one line.

In some cases, the lines representing transactions are straight lines. In other cases, the lines may be formed of two or more segments, where one or more segments of each line represent a different phase of the transaction. A user, for example, may choose to change the scale of the displayed 2D coordinate system to view additional details relating to the transactions. In doing so, the system may change the visualization presented, e.g., redraw the transactions using different units on either the vertical axis and/or the horizontal axis, show more detail, etc.

The inventive arrangements described herein may be implemented as a method or process performed by a data processing system. In another aspect, the inventive arrangements may be implemented as a data processing system having a processor and a display device. The processor, upon executing program code, performs the various operations described herein and generates the visualizations described herein upon the display device. In still another aspect, the inventive arrangements may be implemented as a non-transitory computer-readable storage medium storing program code that, when executed, causes a processor and/or a system to perform a method or process.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 is a block diagram illustrating an exemplary data processing system (system) 100. System 100 includes at least one processor, e.g., a central processing unit (CPU), 105 coupled to memory elements 110 through a system bus 115 or other suitable circuitry. System 100 stores program code within memory elements 110. Processor 105 executes the program code accessed from memory elements 110 via system bus 115. In one aspect, system 100 is implemented as a computer or other data processing system that is suitable for storing and/or executing program code. It should be appreciated, however, that system 100 can be implemented in the form of any system including a processor and memory that is capable of performing the functions described within this disclosure.

Memory elements 110 include one or more physical memory devices such as, for example, a local memory 120 and a bulk storage device 125. Local memory 120 refers to random access memory or other non-persistent memory device(s) generally used during actual execution of the program code. Bulk storage device 125 may be implemented as a hard disk drive (HDD), solid state drive (SSD), or other persistent data storage device. System 100 also may include one or more cache memories (not shown) that provide temporary storage of at least some program code in order to reduce the number of times program code must be retrieved from the bulk storage device during execution.

Input/output (I/O) devices such as a keyboard 130, a display device 135, and a pointing device 140 optionally can be coupled to system 100. The I/O devices can be coupled to system 100 either directly or through intervening I/O controllers. A network adapter 145 also can be coupled to system 100 to enable system 100 to become coupled to other systems, computer systems, remote printers, and/or remote storage devices through intervening private or public networks. Modems, cable modems, Ethernet cards, and wireless transceivers are examples of different types of network adapter 145 that can be used with system 100.

As pictured in FIG. 1, memory elements 110 can store an electronic design automation (EDA) application 155. EDA application 155, being implemented in the form of executable program code, is executed by system 100. As such, EDA application 155 is considered an integrated part of system 100. System 100, while executing EDA application 155, operates upon transaction data 160. Transaction data 160 includes data for a plurality of transactions of a transaction-based system. Transaction data 160 may be obtained from an emulation of a transaction-based system, from a simulation of a transaction-based system, from a live transaction-based system, from a theoretical model of a transaction-based system, or collected by other means.

As defined within this disclosure, a "transaction-based system" is any system that conducts operations using transactions. Transaction-based systems include queuing systems, communication systems, information processing systems, and the like. Specific examples of transaction-based systems include, but are not limited to, client-server systems, processor systems, offload processing systems, memory management systems, database systems, telephony systems, and warehouse management systems.

As defined within this disclosure, the term "transaction" refers to any integral sequence of one or more events that follow a predefined protocol or set of rules. In one aspect, the protocol is for the transmission or processing of data. Transactions may be used in one or more information processing systems or communication systems in different contexts. For example, transactions may be used with HyperText Transfer Protocol (HTTP) over a persistent Transmission Control Protocol (TCP) connection, a Remote Procedure Call (RFC 5531) in a distributed operating system, a transfer at the Peripheral Component Interconnect (PCI) Express transaction layer over a PCI Express bus, data exchanges using an Advanced eXtensible Interface (AXI) protocol compliant interconnect, an Avalon bus, Double Data Rate (DDR) memory operation, warehouse operation, a bank transaction, etc.

EDA application 155 and any data items used, generated, and/or operated upon by EDA application 155 are functional data structures that impart functionality when employed as part of system 100. System 100, in executing EDA application 155, generates visualizations of transaction data 160 that are displayed on display device 135. A user of system 100 may choose to change the visualization of transaction data 160 generated by system 100 to view different details as desired and described herein with reference to the remaining figures.

In general, system 100 visualizes the behavior and performance of transaction-based systems and the individual transactions for such systems with scalable precision. The visualizations use an x-y coordinate system with the x-axis representing time and the y-axis demarcated according to selected transaction characteristics. As defined within this disclosure, a "transaction characteristic" means an event of a protocols or set of rules followed by the transactions, a value such as a statistic or other numerical quantity of, or derived from, the transactions, or a combination of both.

Figure 2:
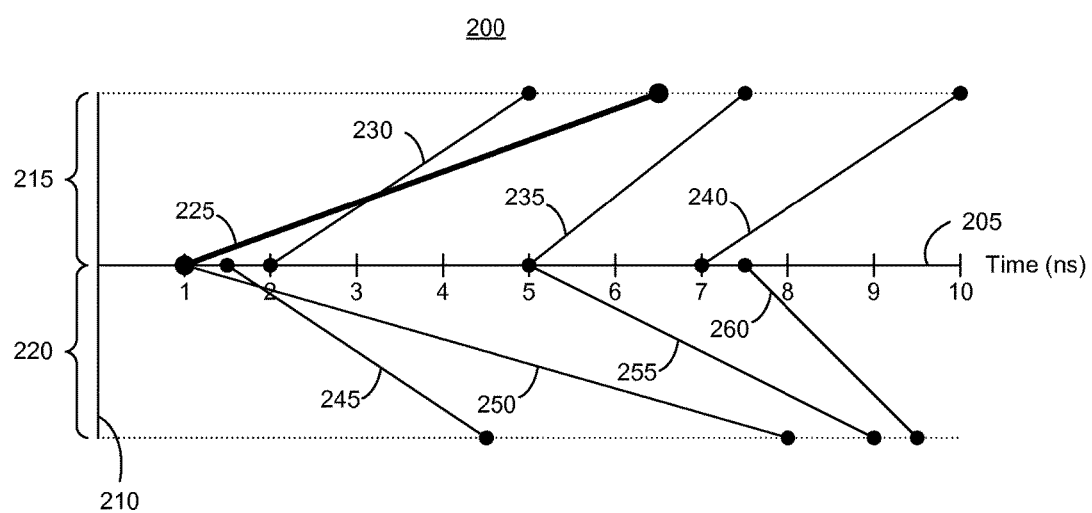
FIG. 2 is an exemplary visualization of transactions of a transaction-based system displayed by the system of FIG. 1.

FIG. 2 is an exemplary visualization 200 of transactions of a transaction-based system displayed by the system of FIG. 1. Visualization 200 is presented as a 2D graph representation that may be displayed on a display device. Visualization 200 includes an x-axis 205 and a y-axis 210. Each line on visualization 200 represents one transaction. The lines pictured in FIG. 1 have a single segment since each line is defined by two events. Each line is defined by a start event and a stop event. In general, an N-segment line, where "N" is an integer value, has N+1 vertexes where each vertex represents an event of the transaction. Since the lines of FIG. 2 include a single segment, each line has a start end representing a start event of a transaction and a terminating end representing an end event of the transaction. Each event of a transaction is represented as a dot or node on each line.

Visualization 200 shows transactions of two different types. Transactions of the first type, e.g., type 215, start on the x-axis and extend above the x-axis. Type 215 transactions include transactions 225, 230, 235, and 240. Transactions of a second type, e.g., type 220, start on the x-axis and extend below the x-axis. Type 220 transactions include transactions 245, 250, 255, and 260. Both type 215 transactions and type 220 transactions are represented by oblique lines where each line forms an acute angle with the x-axis. Each line representing a transaction has a unit height of one.

The x-axis is demarcated in units of time. For example, in the case of an electronic system, the x-axis may be demarcated in nanoseconds, in clock cycles, or the like. Referring to a transaction represented by line 225, the start event represented by the start end of line 225 is located at time 1 (x=1). For ease of illustration, lines and transactions may be referred to using the same reference number. In illustration, line 225 represents a transaction. The transaction represented by line 225 may be called transaction 225.

Within FIG. 2, four overlapping transactions of type 215 are shown. Each of type 215 transactions 225, 230, 235, and 240 is defined by the start and terminating x-coordinates of (1, 6.5), (2, 5), (5, 7.5), and (7, 10), respectively. FIG. 2 also shows four overlapping type 220 transactions. Each of type 220 transactions 245, 250, 255, and 260 is defined by the start and terminating x-coordinates of (1, 8), (1.5, 4.5), (5, 9), and (7.5, 9.5), respectively.

Line 225 has a start end representing a start event of transaction 225 located at (1, 0) and a terminating end representing an end event of transaction 225 located at (6.5, 1). Line 225 has a single segment connecting the start end and the terminating end. Line 230 represents a transaction 230. Line 230 has a start end representing a start event of transaction 230 located at (2, 0) and a terminating end representing an end event of transaction 230 located at (5, 1). Since each line is formed of a single segment, each line has a constant slope, though different transactions may be represented by lines of different slopes.

As pictured, line 225 crosses line 230. This means that transaction 225, while starting before transaction 230, finishes after transaction 230. To more clearly indicate this crossing, line 225 has been bolded. In another aspect, line 225 is bolded to indicate that transaction 225 is taking too long to complete, e.g., as determined using the difference between the terminating and start x-coordinates compared with a time threshold. It should be appreciated, however, that any of a variety of different visualization techniques may be used to visually distinguish one line, or segment of a line, from another line and/or from other segments of the same line or different line(s). For example, line 225 may have a color that is different from each other line that does not cross another line. In another example, responsive to the system determining that transaction 225 required more than a minimum amount of time, e.g., a threshold amount of time, to complete, the system visually highlights or distinguishes transaction 225 from the other transactions.

In one aspect, visualization 200 may illustrate transactions in an electronic system such as transactions that take place among one or more circuit blocks over interconnects implemented within an integrated circuit (IC). For purposes of illustration, consider the case where the transactions of visualization 200 occur over an IC interconnect. In that case, type 215 transactions are read transactions. Type 220 transactions are write transactions. In the example shown, read transaction 225 overlaps read transaction 230. Similarly, write transaction 245 overlaps write transaction 250.

Continuing with the above example, the events of the illustrated transactions are ordered horizontally according to event timestamp. Vertically the events are serialized in the logical order of the rules, e.g., the communication protocol in this case, followed by the transactions. For example, a write transaction may include a list of events in the following logical order: (1) send address, (2) start sending data, (3) end sending data, and (4) receive response.

Within FIG. 2, only two events of each transaction are used to define each line. More particularly, the start event and the end event of each transaction are used to define each line. It should be appreciated, however, that any two events of a transaction may be used. In the case of a read transaction, the start event is the sending of the read address and the end event is the receipt of the last data of the read transaction. Each of the noted events is located at an x-coordinate equal to the timestamp of the event. The y-coordinate of the first end of each line is zero. The y-coordinate of the second end of each line is a constant.

Within visualization 200, one or more transactions may be visually distinguished from other transactions based upon any of a variety of different transaction characteristics. For example, the system may visually distinguish a transaction with latency above a particular threshold or a transfer rate below a particular threshold, as determined by the total time of the transaction or the absolute slope of the transaction, from other transactions that have a latency below the threshold or a data transfer rate above the threshold. The term "absolute," as used herein with reference to slope, refers to the slope of lines above and below the x-axis. In response to the system visually distinguishing a transaction such as transaction 225 from other transactions, the user may choose an option in EDA application 155 to scale visualization 200 to see increased detail. A user may choose an option to scale visualization 200, however, regardless of observing any anomalous characteristics.

FIG. 2 illustrates that both read and write transactions of a full-duplex or multi-channel interface may be visualized on a single plot, or single 2D coordinate system. Events of the read transactions are plotted above the x-axis. Events of write transactions are plotted below the x-axis. Further, either type of transactions may be scaled, at least along the y-axis, for a more detailed view independently of any scaling applied to the other type of transactions. While read transactions are plotted above the x-axis and write transactions below, the visualization may be displayed with read transactions below the x-axis and write transactions above. In another example, one type of transaction, e.g., read or write, may be selected and displayed either above or below the x-axis according to user preference.

Scaling of visualization 200 may be performed by changing the number of events that are shown on the 2D coordinate system. Showing two events per transaction represents the simple case where each transaction is represented as a straight line. A different scaling may show more captured events per transaction resulting in each transaction being represented by a multi-segment line.

Figure 3:
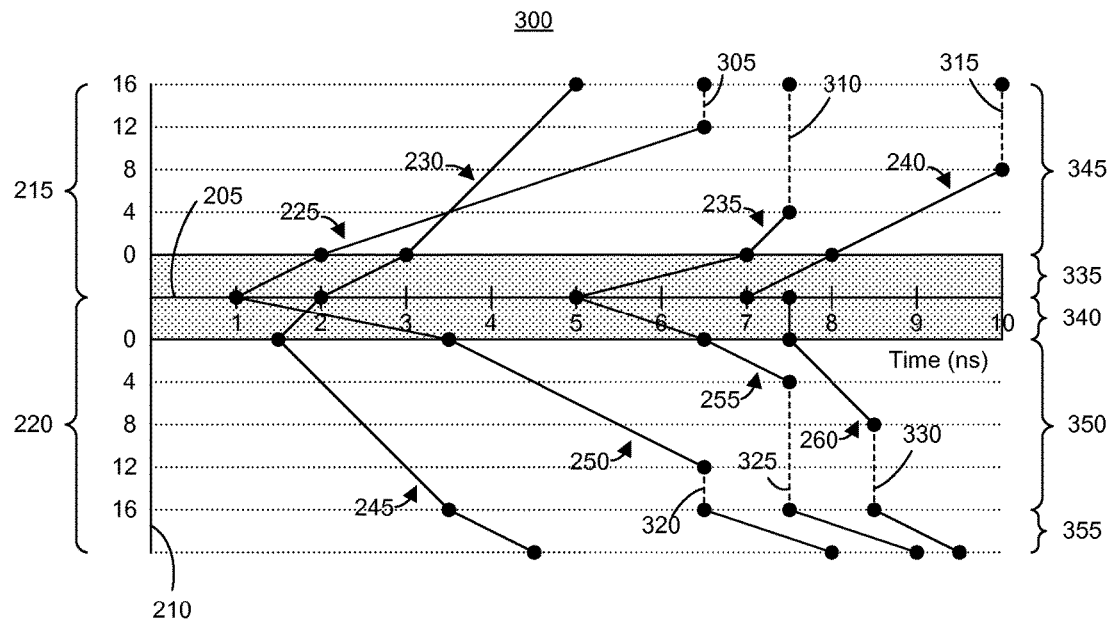
FIG. 3 is another exemplary visualization of transactions of a transaction-based system displayed by the system of FIG. 1.

FIG. 3 is another exemplary visualization 300 of transactions of a transaction-based system displayed by the system of FIG. 1. Visualization 300 also is presented as a 2D graph that may be displayed on a display device. Visualization 300 is a scaled version of visualization 200. In visualization 300, the units of the x-axis remain the same, while the units of the y-axis have changed to reflect different transaction characteristics. While transactions no longer have a unit height of one, each transaction still has a same height or y-coordinate for the terminating end.

Within FIG. 3, lines representing transactions are expanded into two or more connected segments resulting in multi-segment lines. Each multi-segment line describes a path from the start of the first segment to the end of the last segment. Each multi-segment line illustrates the progress of the transaction through different phases of the transaction. The slope of each segment visually represents duration for the phase of the transaction represented by that segment. Comparison of the slopes of different segments gives an immediate visual indication of the relative performance of the corresponding transactions.

The number of events now displayed for each transaction within FIG. 3 is increased. For type 215 transactions, each line is formed of at least three events and has at least two segments. For type 220 transactions, each line is formed of at least four events and has at least three segments. As defined herein, a segment is a portion of a line between two consecutive vertices or events.

It should be appreciated that the number of events shown will depend upon the particular transactions being illustrated. For example, events may be defined by the underlying rules, e.g., protocols, of the subject transaction system. In this regard, the number of events is not intended to be limited by the examples shown.

In one aspect, each segment represents a different phase of a transaction. As such, each transaction may include two or more different phases, where each phase is represented by a segment. A "phase" of a transaction may have different meanings depending upon the particular transaction-based system for which transactions data is visualized. In one aspect, a "phase" of a transaction means a sequence of alternating transfer and waiting periods of one type of information. Referring again to IC interconnects, a typical read transaction includes the read address phase and the read data phase. A typical write transaction includes a write address phase, a write data phase, and a write response phase.

In the example of FIG. 3, some phases of a transaction include a first segment followed by a "virtual segment." As defined within this disclosure, a "virtual segment" is a vertical segment of a line formed of a plurality of segments. The length of the virtual segment extends the multi-segment line to which the virtual segment is added or incorporated to end at a maximum y-coordinate value within the representation. In one aspect, for example, a phase of a transaction may be formed of a first segment followed by a virtual segment where the virtual segment ends at a greater absolute y-coordinate than the end of the first segment to which the virtual segment is directly coupled.

Virtual segments do not represent a real phase change in the transaction. The virtual segments may be introduced to more clearly illustrate the ending time of each transaction relative to the x-axis. As such, each phase is still materially represented by one segment. For purposes of illustration, virtual segments in FIG. 3 are illustrated using dashed lines. Virtual segments 305, 310, and 315 are added to transactions 230, 235, and 240, respectively. Creation of a virtual segment typically requires insertion of an additional node, e.g., a virtual node.

Referring to transactions 230, 235, and 240, the virtual node is inserted with a y-coordinate value of 16 and the virtual segments are added following each transaction to connect to the added virtual nodes. Virtual segments 320, 325, and 330 are added to transactions 250, 255, and 260, respectively. Virtual segments 320, 325, and 330 are added in a mid-portion of each of transactions 250, 255, and 260 so that each terminating end of the line for the transaction ends at a maximum y-coordinate. In each case, the transaction represented by the multi-segment line has a last segment with a terminating end for the transaction located at a y-coordinate less than a maximum y-coordinate. Adding a virtual segment extends the multi-segment line so that an end of the multi-segmented line has a y-coordinate equal to the maximum y-coordinate. The end of the multi-segment line may be the end of the last segment or the end of the virtual segment.

Visualization 300 is a multi-phase visualization. As defined herein, a multi-phase visualization is a 2D visualization using an x-y coordinate system where each line is formed of at least two segments, where each line represents a transaction and each segment represents at least a portion of a phase and not more than one phase of a transaction. In a multi-phase visualization, e.g., visualization 300, the span of any segment along the x-axis shows the timespan of that segment and, as such, the timespan of the phase represented by the segment. In the example of FIG. 3, the span of any segment along the y-axis shows the "cost" of that segment as calculated using a selected, e.g., a user selected, cost function. The cost function used for each different phase, and corresponding span of the y-axis, may be different. In the case of an IC interconnect, for example, cost may mean the number of transferred words within the phase represented by the segment. In another aspect, the cost may be the data transfer time within the phase represented by the segment.

Each different phase represented by a segment may be measured in different units on the y-axis. For example, the system may display one or more different unit scales responsive to a user input selecting a different segment of a line. Each segment may also be visually distinguished from each other segment of a same transaction. For example, all like segments across transactions may have a same color or styling.

FIG. 3 shows the same transactions as pictured in FIG. 2, with greater detail in terms of showing multi-phase information for each transaction. Consider the case of read and write transactions. Each read transaction, e.g., transactions 225, 230, 235, and 240, includes a first segment representing a read address phase and a second segment representing a read data phase. Each write transaction, e.g., transactions 245, 250, 255, and 260, includes a first segment representing a write address phase, a second segment representing a write data phase, and a third segment representing write response phase.

In one aspect, visualization 300 may be subdivided into multiple partitions. Each partition is a region of the visualization having a lower bound that is a horizontal line defined by a first point on the y-axis and an upper bound that is a horizontal line defined by a second and different point on the y-axis. In one aspect, partitions correspond to phases, so that the upper and lower bounds of a partition are the upper and lower bounds of the phase represented by the partition.

For example, visualization 300 includes a partition 335 and a partition 340, each indicated with shading. For type 215 transactions, a region, i.e., partition 335, is introduced between the x-axis and the y-coordinate of zero. For type 220 transactions, a region, i.e., partition 340, is introduced between the x-axis and the y-coordinate of zero below. In creating partitions 335 and 340, the zero on the y-axis is scaled away from the x-axis forming each respective partition 335 and 340. Partition 335 may be used for the read address phases. Partition 340 may be used for the write address phases.

Partition 345 and partition 350 represent data transfer phases of the read transactions and data transfer phases of write transactions, respectively. The y-axis in partitions 345 and 350 may be demarcated in units corresponding to number of words transferred. By adjustment of the y=0 position on the y-axis both above and below the x-axis, the number of words transferred may be more clearly illustrated using the y-axis in partitions 345 and 350. The number of words transferred does not include any data exchanged during the read and/or write address phase, for example. Additional partition 355 is also created for type 220 transactions, which uses a different demarcation on the y-axis than does partition 350. For example, the y-axis for partition 355 may be demarcated in units of time same as the x-axis. The height of partition 355 in terms of the y-axis may be scaled to the average time span of all segments in partition 355.

Each partition may use a demarcation or unit on the y-axis that is dependent upon, or specific to, the particular phase or phases of the transaction represented by the partition. As noted, each partition may use a different demarcation or unit.

In another aspect, more than one additional region such as regions 335 and/or 340 may be introduced into a visualization to account for various protocol scenarios. For example, in more complex communication protocols such as those using 3-way handshaking between source (master) and destination (slave) of a transaction, a region may be introduced to indicate that no data is transferred in that region.

FIG. 3 illustrates an example where demarcation of the y-axis creates one or more partitions. The partitions may be of uniform height. These partitions correspond to phases of the underlying protocol and are ordered vertically. Within a partition each transaction is represented by a line of one or more segments. For a given partition of the visualization, each transaction has common start y-coordinate and a common end y-coordinate. In visualization 300, for example, each type 220 transaction has a start y-coordinate of 0 for the data transfer phase and an end y-coordinate of 16 for the data transfer phase. Each line representing a transaction is ordered in time along the x-axis as determined by the timestamp of the start and end points of the transaction. The slopes of the individual segments of each line vary with how long the transaction takes to complete each particular phase.

Figure 4:
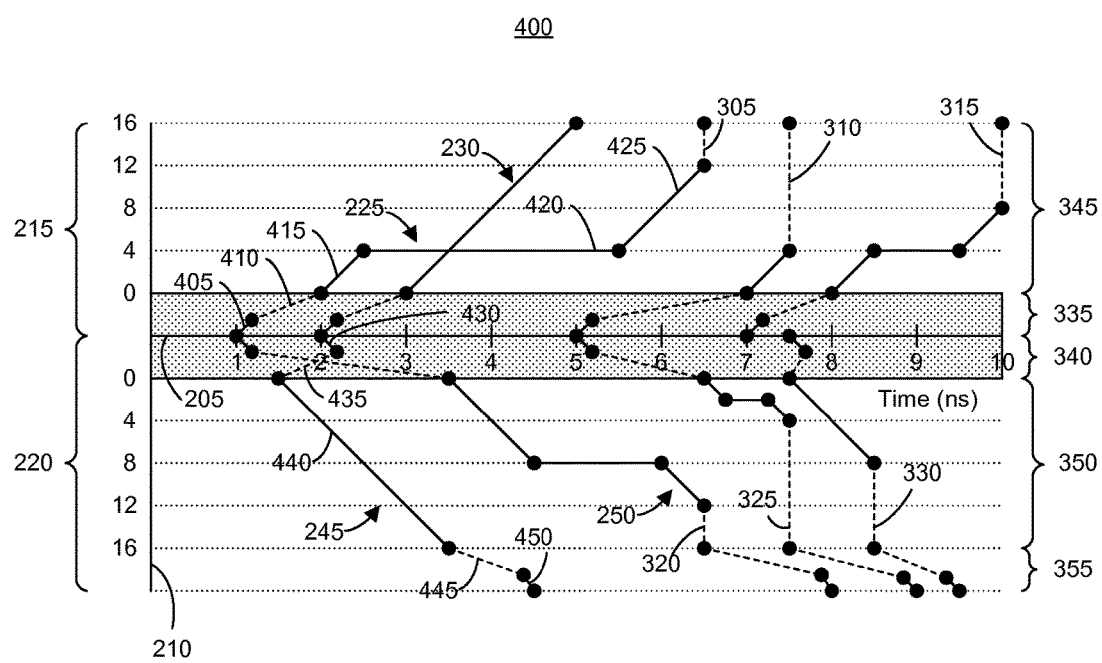
FIG. 4 is another exemplary visualization of transactions of a transaction-based system displayed by the system of FIG. 1.

FIG. 4 is another exemplary visualization 400 of transactions of a transaction-based system displayed by the system of FIG. 1. Visualization 400 also is presented as a 2D graph that may be displayed on a display device. Visualization 400 is a scaled version of visualization 300. In visualization 400, the units on both the x-axis and the y-axis remain the same as those of visualization 300. Additional events are illustrated for each transaction resulting in more vertices for each transaction and more segments in each transaction. FIG. 4 shows the same transactions as pictured in each of FIGS. 2 and 3, albeit with greater detail.

Visualization 400 depicts each event and each phase for the various transactions shown. Continuing with the example of read and write transactions, each phase of a transaction is further expanded into a multi-segment line where every vertex represents a start or a stop of a continuous message transfer. As defined herein, the term "message" means any type of digital information carried over a communication interface. Examples of messages include addresses, data, requests, responses, or the like.

In visualization 400, three different types of segments are illustrated not including the virtual segments. A first type of segment is a solid diagonal segment signifying a continuous transfer where the absolute slope of the segment is proportional to the data transfer rate. The second type of segment is a horizontal solid segment spanning across the time where the interface master is waiting for a next continuous transfer of the same type of message. A third type of segment is a dotted diagonal segment that connects an end of one continuous transfer and the beginning of a next continuous transfer of a different type of message. For example, a dotted diagonal segment is used to connect an end of a read address phase with a beginning of a read data phase.

Within visualization 400, the span of a segment on the x-axis shows the amount of time the corresponding phase, or part of a phase, consumes. The span of a segment along the y-axis shows the "cost" of the phase as measured in the number of transferred words.

In FIG. 4, each phase of a transaction is expanded into multiple segments. Thus, a segment in FIG. 4 may represent a portion, or part, of a phase of a transaction. In the example of FIG. 4, segments belonging to a same phase of a transaction may have a same first identifying characteristic such as color and have a different second identifying characteristic such as line style determined according to segment type. For example, referring to transaction 225, segment 405 may be the same color as segment 410 since both segments 405 and 410 are part of the read address phase. Segment 405 is solid indicating a transfer of data for the read address. Segment 410 is a dotted line indicating a waiting period between the end of the sending of the read address and the beginning of the next phase, i.e., the read data phase.

Each of segments 415, 420, and 425 are part of the read data phase of transaction 225 and are colored the same, but different than segments 405 and 410. Segments 415 and 425 have a non-zero slope indicating actual data transfer occurring for the time period defined by the span of each segment along the x-axis. Segment 420, however, having a slope of zero, indicates no actual data transfer for the span measured along the x-axis.

FIG. 4 provides additional detail and illustrates that the length of time for transaction 225 to complete is, at least in part, due to the handling of transaction 230. Transaction 230 has higher priority than transaction 225. In consequence, data transfer during the read data phase for transaction 225 is interrupted by data transfer of the read data phase of transaction 230.

Within FIG. 4, each data transfer, whether during the read address phase, the read data phase, the write address phase, the write data phase, or the write response phase, as indicated by the diagonal solid segments, has a same absolute slope. The same absolute slope is indicative of an interface operating at a fixed clock rate where each continuous transfer of data achieves a same bandwidth. State change segments represented by diagonal dotted segments, which effectively represent wait times for a next phase to start, may have different or varying absolute slopes.

Visualization 400 provides additional information relating to the cause of transaction 245 crossing transaction 250. Transaction 245 is a write transaction and includes segments 430, 435, 440, 445, and 450. The write data phase of transaction 245 starts at (1.5, 0) and continues to (3.5, 16) as represented by segment 440. The write address phase, however, starts at x=2 and continues until approximately x=2.2. Segments 430 and 435 represent the write address phase. The write address phase begins after the write data phase, e.g., the phases are out of sequence. As such, dotted segment 435 forms an obtuse angle with the x-axis when measured from the portion of the x-axis to the right of the x-coordinate of 2.2 in order to couple segment 430 to segment 440. The write response phase is represented by segments 445 and 450. Segment 445 is a dotted line indicating that the write data phase has ended and a response signal is awaited. Segment 450 represents the actual data transfer involved in providing the write response signal(s).

In the case of a signaling interface of an electronic system, each transaction may take place over two or more different channels. As an example, consider the case where FIG. 4 represents transactions taking place over an IC interconnect. The interconnect may be implemented as an Advanced eXtensible Interface (AXI) protocol compliant interconnect. In that case, the various phases described correspond to the different channels that are available within the AXI protocol.

FIG. 4 further illustrates a case where the slope of segments indicates complexity of the transaction system from which the transactions were obtained. More particularly, in cases where a multi-segment line appears to move back in time as is the case with transaction 245, e.g., where a segment goes left when time increases to the right, the segments indicate that the transaction system or a protocol, for example, does not restrict the end of a first phase and the beginning of a next phase to be in time order. An AXI protocol may demonstrate such complexity which occurs because a write may transfer data prior to transferring an address or vice versa. Transaction 245 further illustrates a multi-channel protocol supporting concurrent operations.

Figure 5:
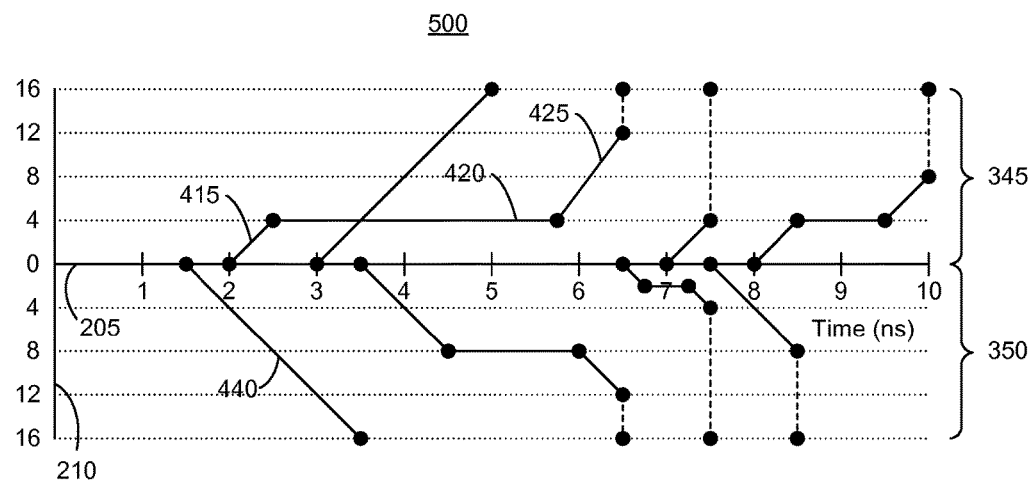
FIG. 5 is another exemplary visualization of transactions of a transaction-based system displayed by the system of FIG. 1.

FIG. 5 is another exemplary visualization 500 of transactions of a transaction-based system displayed by the system of FIG. 1. Visualization 500 also is presented as a 2D graph that may be displayed on a display device. Visualization 500 illustrates an example where transactions of a particular channel, or phase, are shown. Visualization 500 may be displayed responsive to a user input received by system 100 requesting display of transactions of a selected phase or channel of a transaction-based system.

For purposes of illustration, the data phase for both read and write transactions is illustrated. This means that for transaction 225, for example, only segments 415, 420, and 425 are shown in visualization 500. For transaction 245, only segment 440 is shown. In visualization 500, the units on both the x-axis and the y-axis remain the same as those of visualization 400 for the partitions shown.

Visualization 500 illustrates an aspect where partitions may be contracted, e.g., hidden, responsive to one or more user inputs requesting such an operation to emphasize particular phases of interest. It should be appreciated that any contracted or hidden partition may be expanded responsive to one or more user inputs. In some cases, responsive to one or more user inputs, the visualization may illustrate mixed representations where some partitions are expanded into multi-segment lines and other partitions remain as single lines. In still another aspect, responsive to one or more user inputs requesting such operations, the visualization may be scaled so that statistics determined from a group of transactions, i.e., those displayed, for demarcation of the y-axis on a per-partition basis may be performed to accentuate comparison of performance characteristics of individual phases.

The visualizations described with reference to FIGS. 2-5 may be used in cases where transactions have same transaction identifiers or different, e.g., multiple, transaction identifiers. Referring again to the AXI protocol, multiple transaction identifiers may be used. Transactions with the same transaction identifier are permitted to overlap and must proceed in the same order as issued. Transactions with different transaction identifiers may proceed out of order. The visualizations described herein provide clear and concise visual verification to a user whether representing transaction data of a transaction-based system that uses single transaction identifiers or multiple transaction identifiers.

Referring to FIGS. 2 and 3, read transactions 225 and 230 have different transaction identifiers since the two transactions complete out of order. More particularly, transaction 225 starts prior to transaction 230, but completes after transaction 230. Write transactions 245 and 250 also have different transaction identifiers since transaction 250 starts prior to transaction 245 and completes after transaction 245.

Figure 6:
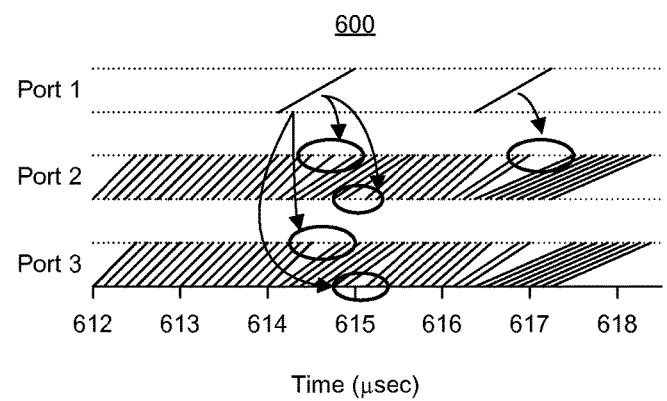
FIG. 6 is another exemplary visualization of transactions of a transaction-based system displayed by the system of FIG. 1.

FIG. 6 is another exemplary visualization 600 of transactions of a transaction-based system displayed by the system of FIG. 1. Visualization 600 illustrates exemplary read transactions that may be displayed on a display device. The transactions on each of a plurality of ports 1, 2, and 3 are shown concurrently. The read transactions for each of ports 1, 2, and 3 are horizontally stacked and vertically aligned. By showing the read transactions for each port time-aligned as pictured in FIG. 6, backpressure exerted on ports 2 and 3 in consequence of a higher priority transaction on port 1 is visible. The arrows originating from the transactions on port 1 point to the circles indicating back pressure in transactions on each of ports 2 and 3 where delayed transaction ends of a first few transactions (upper circle for each of ports 2 and 3 at approximately x=614.5) result in delayed transaction starts of several subsequent transactions (lower circle for each of ports 2 and 3 at approximately x=615).

In the case of an AXI interconnect, FIG. 6 may illustrate more detailed information. The second transaction on port 1 induces white space at the terminating end of lines on port 2 illustrated by the circle located at approximately x=617. The circle located at x=617 on port 2 indicates delays in data transfer. The delays in data transfer are characterized by consecutive lines of decreasing slope. By comparison, the circle located at x=615 on port 3 indicating white space at the bottom, or start end, of lines indicates back pressure as previously noted. In this example, the back pressure occurs at the address buffer. Back pressure is characterized by a larger spacing between transaction start points between two consecutive transactions that between the immediately prior set of two consecutive transactions. Further, back pressure may be characterized by decreasing slope between the two transactions with larger than normal delay in start times.

Figure 7:
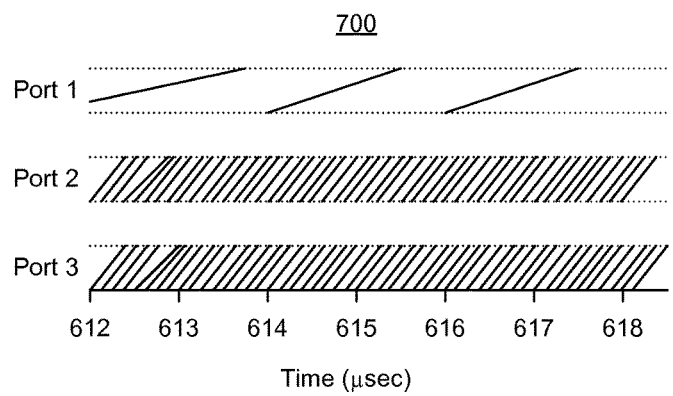
FIG. 7 is another exemplary visualization of transactions of a transaction-based system displayed by the system of FIG. 1.

FIG. 7 is another exemplary visualization 700 of transactions of a transaction-based system displayed by the system of FIG. 1. Visualization 700 illustrates exemplary read transactions that may be displayed on a display device. Visualization 700 illustrates the same data traffic as illustrated in visualization 600 with the exception that ports 2 and 3 are set to a higher priority. A user viewing visualization 700 may observe that the transactions on port 1 have a smaller effect on the transactions of port 2 and port 3 than illustrated in visualization 600. Another consequence of increasing the priority of ports 2 and 3 is the increased duration of transactions on port 1, which is also easily observable as decreased slope.

Figure 8:
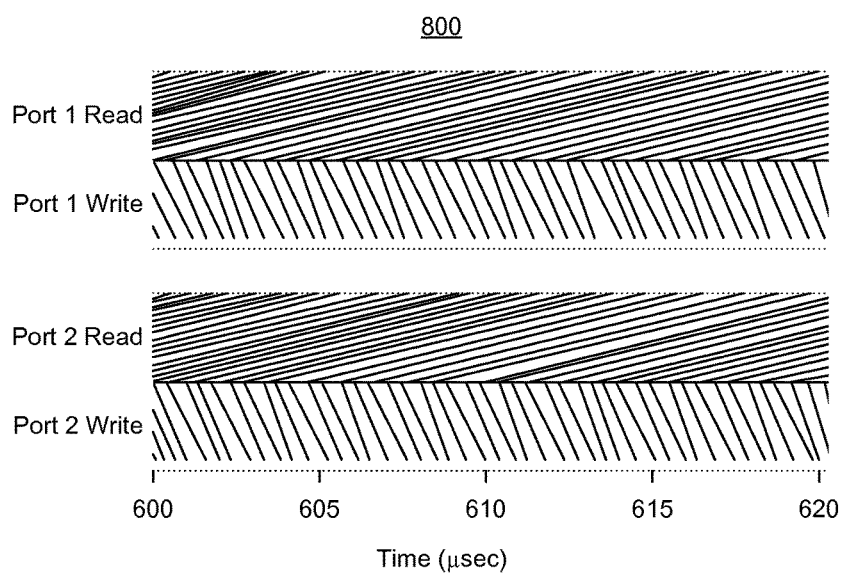
FIG. 8 is another exemplary visualization of transactions of a transaction-based system displayed by the system of FIG. 1.

FIG. 8 is another exemplary visualization 800 of transactions of a transaction-based system displayed by the system of FIG. 1. Visualization 800 illustrates read and write transactions for multiple ports concurrently within a single, or unified, graph that may be displayed on a display device. Visualization 800 permits a user to observe performance of multiple interfaces side-by-side. Further, the read and write ports of an interface are paired together to more clearly illustrate any asymmetry between read transaction performance and write transaction performance for a full-duplex interface.

Figure 9:
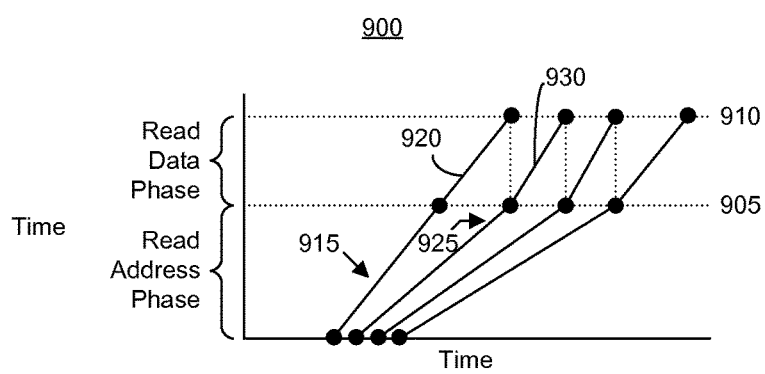
FIG. 9 is another exemplary visualization of transactions of a transaction-based system data displayed by the system of FIG. 1.

FIG. 9 is another exemplary visualization 900 of transactions of a transaction-based system displayed by the system of FIG. 1. Visualization 900 illustrates read transactions that may be displayed by a display device. In visualization 900, both the x-axis and the y-axis are demarcated in units of time. Horizontal line 905 is positioned at a time value on the y-axis equal to the mean latency of the read address phase of the read transactions over a user-specified sliding window. Horizontal line 910 is positioned at a time value on the y-axis equal to the mean latency of the entirety of the displayed read transactions.

The read transactions illustrated in visualization 900 do not overlap indicating that single transaction identifiers are used. Segment 920 represents the read data phase of transaction 915. Segment 930 represents the read data phase of transaction 925. As pictured, the read data phase of transaction 925 does not start until the read data phase of transaction 915 (i.e., segment 920) completes. The terminating end of segment 920 is vertically aligned with the start end of segment 930. The effect of queuing delay in the transactions may be observed in the form of decreasing slopes for each address phase segment of each transaction as the transaction awaits completion of the read data phase from the prior transaction.

Line 905 represents the point at which the read address phase ends and the read data phase beings, which further equals the end time of the preceding transaction. FIG. 9 illustrates an example where the height of a selected partition, e.g., the read data phase, is adjusted to be equal to a statistic derived from the set of transaction segments associated with that phase of the protocol. In this example, the partition height of the data transfer phase of a group of read transactions is set equal the average data transfer latency of the group. Transactions whose transfer latencies exceed the average show up as line segments with slopes less than 1. Transactions with transfer latencies match the average latency have slopes of precisely 1. Transactions with transfer latencies less than the average show up as line segments with slopes greater than 1.

In one aspect, the read address phase segments may be displayed with the same distinguishing characteristic, e.g., color. Similarly, the data transfer phase segments may be displayed with the same distinguishing characteristic, but one different from the address phase segments, e.g., a different color.

Figure 10:
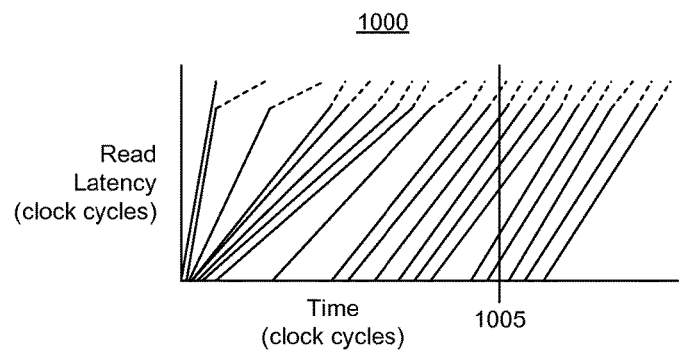
FIG. 10 is another exemplary visualization of transactions of a transaction-based system displayed by the system of FIG. 1.

FIG. 10 is another exemplary visualization 1000 of transactions of a transaction-based system displayed by the system of FIG. 1. Visualization 1000 may be displayed by a display device. In visualization 1000, both the x-axis and the y-axis are demarcated in units of time. In this example, the x-axis represents time demarcated in clock cycles. The y-axis represents latency and is demarcated in clock cycles. Each solid segment of each transaction represents the read address phase of the transaction. Each dotted segment of each transaction represents the read data phase of the transaction. The transactions illustrated in visualization 1000 do not overlap indicating that single transaction identifiers are used.

In the example of FIG. 10, a maximum of seven transactions may be started at one time, e.g., concurrently, with one undertaking data transfer and six being queued at the slave side of the communication interface. Within visualization 1000, a transaction cut set line 1005 is drawn. Transaction cut set line 1005 cuts across a total of seven transactions. Transaction cut set line 1005 cuts across one transaction in the read data phase and another six transactions in the read address phase. As the queue fills, and transaction cut set line 1005 is swept, or moved, to the right, transaction cut set line 1005 cuts through a maximum of one transaction in the data transfer phase and a maximum of six transactions in the address phase.

If moved to the left while transactions are just beginning to flow into the queue, fewer than six transactions may be in the read address phase. Still, at most one transaction will be in the read data phase. Accordingly, transaction cut set line 1005 indicates the number of transactions that are queued at the moment in time where transaction cut set line 1005 is drawn per the x-axis.

In another aspect, the y-axis may be extended below the x-axis and write transactions may be drawn as well. For purposes of illustration and clarity, write transactions are omitted from visualization 1000.

Figure 11:
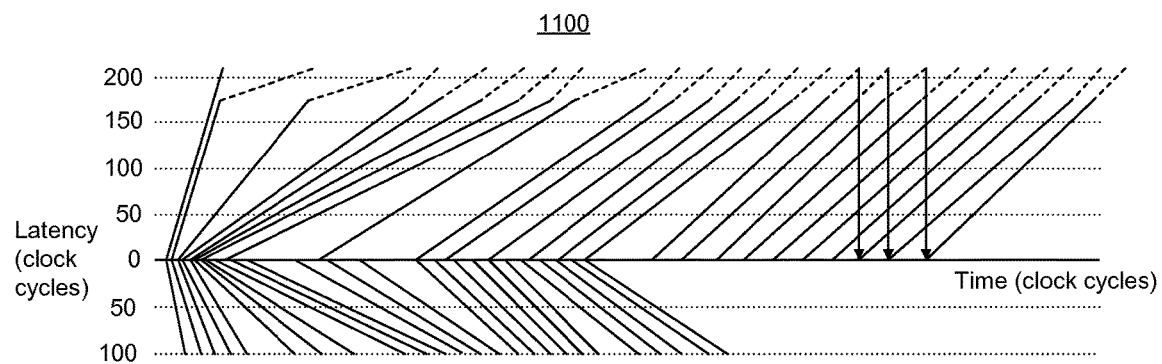
FIG. 11 is another exemplary visualization of transactions of a transaction-based system displayed by the system of FIG. 1.

FIG. 11 is another exemplary visualization 1100 of transactions of a transaction-based system displayed by the system of FIG. 1. Visualization 1100 may be displayed by a display device. In visualization 1100, both the x-axis and the y-axis are demarcated in units of time. The x-axis represents time demarcated in clock cycles. The y-axis represents latency demarcated clock cycles. Each solid segment of each read transaction represents the read address phase of the transaction. Each dotted segment of each transaction represents the data transfer phase of the transaction. The transactions illustrated in visualization 1100 do not overlap indicating that single transaction identifiers are used. In the example of FIG. 11, both read and write transactions are illustrated.

The downward arrow lines illustrate that as the $i^{th}$ transaction completes, e.g., the data transfer phase for the read transaction completes, the $i+7^{th}$ transaction enters the queue. As shown, each vertical arrow begins at the completion of a read data phase and meets the x-axis as the $i+7^{th}$ transaction starts, or enters the queue. Toward the right portion of visualization 1100, where the downward arrow lines are drawn, the queue has reached a steady state of operation. In steady state, new transactions encounter a full queue and server back pressure regulates the rate at which new transactions are allowed to enter the queue.

At the left-most portion of visualization 1100, the first transaction completes quickly. The next 8 to 9 transactions take more time to complete. These 8-9 transactions illustrate the operation of a "cold cache" where requested items to be read are not stored in cache and must be retrieved from memory. As the cache is populated with data, e.g., the cache "warms up," the read transactions take less time. In the example of FIG. 11, the vertical height of the read address phase of each read transaction is a constant 170 cycles, calculated from the mean read address to read data transfer latency of the window of read transactions (e.g., displayed read transactions).

Further, visualization 1100 illustrates an example where the read data phase of each transaction transfers 16 beats of data. If the amount of data requested is variable and randomly distributed, some segments of the transactions would have a slope greater than one, potentially approaching that of a vertical line when fewer than 16 beats of data is transferred. Other segments of the read data phase of the transactions that transfer more than 16 beats of data would have a slope of less than one. The angle of each segment for the read data phase would be variable even in the case where the cache is warm.

Figure 12:
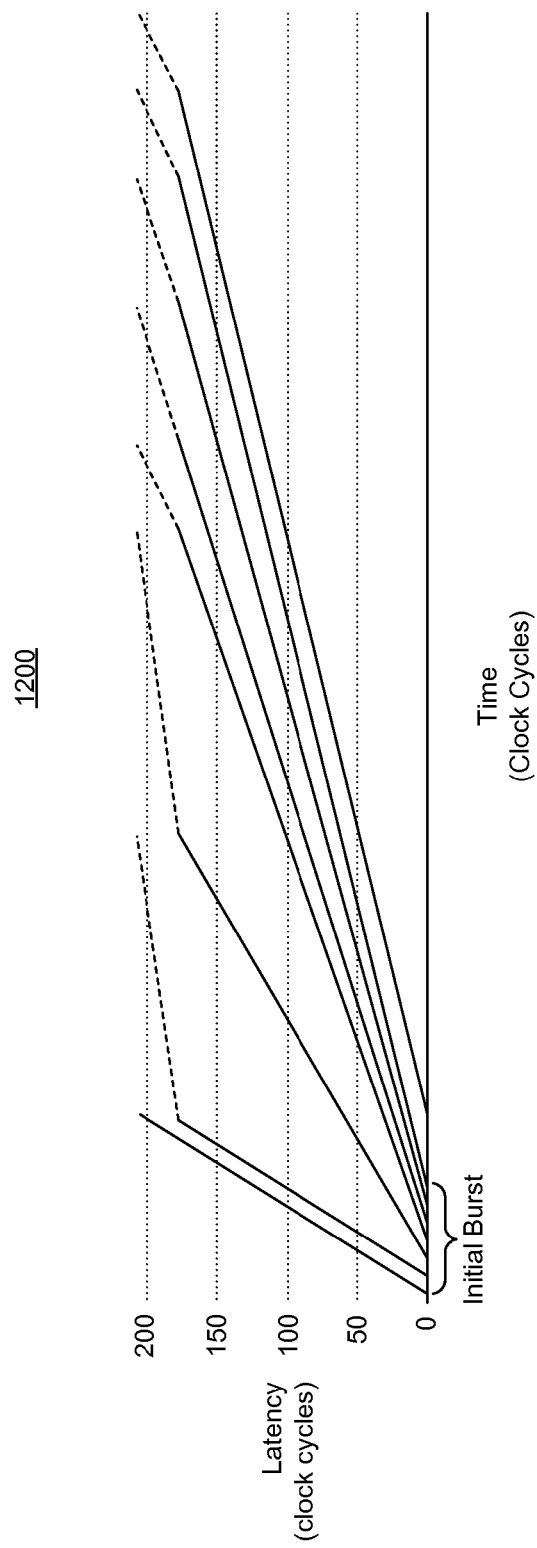
FIG. 12 is another exemplary visualization of transactions of a transaction-based system displayed by the system of FIG. 1.

FIG. 12 is another exemplary visualization 1200 of transactions of a transaction-based system displayed by the system of FIG. 1. Visualization 1200 may be displayed by a display device. In visualization 1200, both the x-axis and the y-axis are demarcated in units of time. The x-axis represents time demarcated in clock cycles. The y-axis represents latency, e.g., time, demarcated in clock cycles. Each solid segment of each read transaction represents the read address phase of the transaction. Each dotted segment of each transaction represents the read data phase of the transaction. The transactions illustrated in visualization 1200 do not overlap indicating that single transaction identifiers are used. In the example of FIG. 12, only read transactions are illustrated.

FIG. 12 illustrates an initial read transaction burst. Seven transactions initially fill the queue. As pictured, the eighth transaction does not enter the queue until the read data phase of the first transaction completes. FIG. 12 illustrates the effect of back pressure delay within the system. The delay in servicing read transactions in the example of FIG. 12 illustrates the effect of a cold cache, where the initial read transactions are cache misses. As the cache warms, a steady state is achieved.

Figure 13:
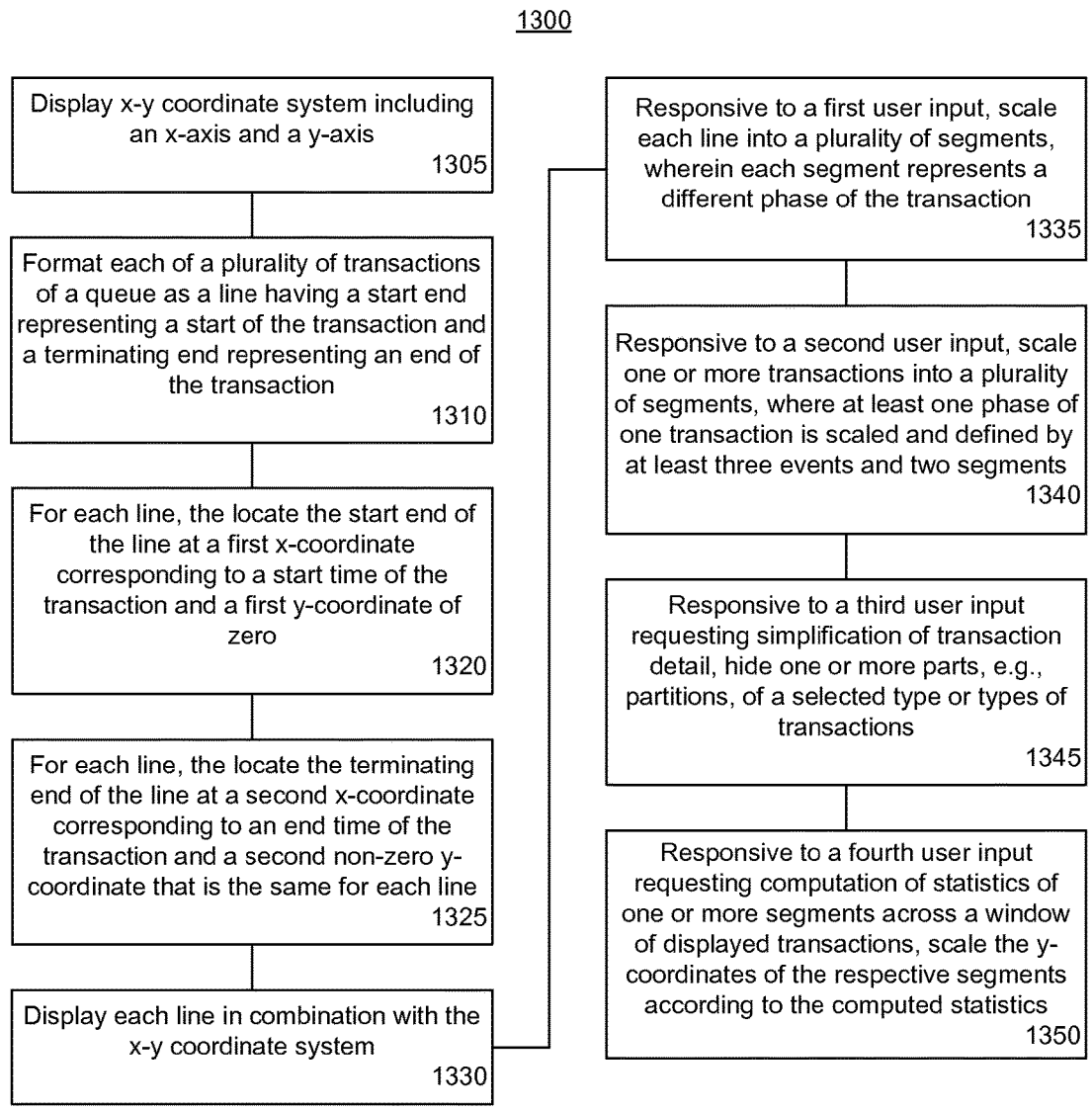
FIG. 13 is a flow chart illustrating an exemplary method of visualizing transactions of a transaction-based system.

FIG. 13 is a flow chart illustrating an exemplary method 1300 of visualizing transactions of a transaction-based system. Method 1300 may be performed by a system as described with reference to FIG. 1. Accordingly, method 1300 may begin in block 1305 where the system displays, on a display device, an x-y coordinate system including an x-axis and a y-axis. The x-axis may be demarcated in units of time and the y-axis may be demarcated in units of a transaction characteristic.

In block 1310, the system formats, using the processor, each of a plurality of transactions of a transaction-based system as a line. Each line has a start end representing a start of the transaction and a terminating end representing an end of the transaction. In block 1320, for each line, the system locates the start end of the line at a first x-coordinate corresponding to a start time of the transaction and a first y-coordinate of zero. In block 1325, for each line, the system locates the terminating end of the line at a second x-coordinate corresponding to an end time of the transaction and a second non-zero y-coordinate that is the same for each line. In block 1330, the system displays each line in combination with the x-y coordinate system.

For example, the system may display a visualization as described with reference to FIG. 2. In one aspect, the system displays transactions of a first type with start ends located on the x-axis and terminating ends above the x-axis. The system may display transactions of a second and different type. The transactions of the second type may be displayed by the system with left ends located on the x-axis and terminating ends below the x-axis. In still another aspect, each line has a non-zero slope. Further, different lines may have different slopes. As previously discussed, the visualization may include only a single transaction type and the displayed transaction type may be situated above or below the x-axis according to preference.

In block 1335, responsive to a first user input, the system scales each line into a plurality of segments where each segment represents a different phase of the transaction. For example, the user may provide an input requesting greater transaction detail. Responsive to the user input, the system may scale the visualization, or alter the x-axis, the y-axis, change the unit of measure of either one or both axes, and/or display additional events for each transaction resulting in a multi-segmented view as described with reference to FIG. 3.

In another example, the system may scale the zero y-coordinate away from the x-axis forming a partition between the x-axis and the zero y-coordinate. The system further may subdivide the y-axis into a plurality of partitions with each partition demarcated independently according to a transaction characteristic selected for a different segment of the plurality of transactions. Further, for each transaction represented by a multi-segment line having a last segment with an end located at a y-coordinate less than a maximum y-coordinate, the system may add a vertical virtual segment extending the multi-segment line so that an end of the multi-segmented line has a y-coordinate equal to the maximum y-coordinate.

In block 1340, responsive to a second user input requesting additional transaction detail, the system may scale one or more transactions into a plurality of segments, where at least one phase of one transaction is scaled and defined by at least three events and two segments.

In block 1345, responsive to a third user input requesting simplification of transaction detail, the system may hide one or more parts, e.g., partitions, of a selected type or types of transactions. Other "unselected" partitions remain displayed within the visualization and may be scaled with respect to the y-axis according to the particular segments of the partition displayed.

In block 1350, responsive to a fourth user input requesting computation of statistics of one or more segments across a window of displayed transactions, the system may scale the y-coordinates of the respective segments according to the computed statistics. The y-coordinates for the selected segment, corresponding to a partition, are scaled using the computed statistics.

As discussed, the system may scale a visualization by redrawing the y-axis with different units, e.g., units of a second or more different transaction characteristics. Further, each segment of a line, when a transaction is drawn to include at least two segments, has an independently determined slope. For example, the slope of each segment is determined by the transaction data compiled for the phase, or part of a phase, of the transaction represented by the segment.

It should be appreciated that the different visualizations described within this disclosure are presented as a graphical user interface that is interactive. A user may select portions of the visualization to be scaled as described or provide user inputs via other modalities. Responsive to a user input, for example, any of the various visualizations described herein may be displayed for a given set of transactions. Further, different parameters may be specified so that transactions of a same type may be displayed or transactions of more than one type may be displayed concurrently. The system further may automatically visually distinguish particular transactions or segments of transactions that violate predetermined thresholds and/or rules.

In accordance with the inventive arrangements described herein, transactions of a transaction-based system are displayed using a 2D coordinate system. One or more transactions may be represented on the 2D coordinate system with each transaction being represented as a line. The visualization may be scaled to reveal more detail for the transactions. Different phases of a transaction may be illustrated as segments, where transactions are represented by a multi-segment line. In some cases, the visualization may be further scaled so that a particular phase of a transaction is represented by more than one segment. The visualizations convey a large amount of data relating to transactions in a transaction-based system in a highly intuitive way.

The set of permissible patterns defined by transaction paths is governed by the rules of the transaction system for which transactions are visualized. In the case of a communication system, for example, the rules are the communications protocol that is followed. Inspection of the paths allows one to gain insight into the operation, correctness, and performance of the underlying transaction-based system. Visual patterns defined by groups of transactions can reveal significant characteristics of the behavior and performance of the transaction-based system. These characteristics may include, but are not limited to, out-of-order transaction execution, back-pressure, "bursty" traffic response, and buffer overflows.

The visualization techniques described within this disclosure have widespread applicability. The visualization techniques may be used to represent hardware and/or software protocols and arbitrary combinations thereof. The visualization techniques may be used to visualize data derived from live systems, simulations, emulations, and theoretical models. The visualization techniques further may be used for arbitrary queuing systems used to model systems ranging from road traffic networks to reliability models reaching beyond conventional communication protocols.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

The terms "a" and "an," as used herein, are defined as one or more than one. The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

As defined herein, the term "automatically" means without user intervention. As defined herein, the term "user" means a human being.

The term "and/or" as used herein refers to and encompasses any and all possible combinations of one or more of the associated listed items. It will be further understood that the terms "includes" and/or "including," when used in this disclosure, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Within this disclosure, the same reference characters are used to refer to terminals, signal lines, wires, and their corresponding signals. In this regard, the terms "signal," "wire," "connection," "terminal," and "pin" may be used interchangeably, from time-to-time, within this disclosure. It also should be appreciated that the terms "signal," "wire," or the like can represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

One or more aspects described within this disclosure can be realized in hardware or a combination of hardware and software. One or more aspects can be realized in a centralized fashion in one system or in a distributed fashion where different elements are spread across several interconnected systems. Any kind of data processing system or other apparatus adapted for carrying out at least a portion of the methods described herein is suited.

One or more aspects further can be embedded in a computer program product, which includes all the features enabling the implementation of the methods described herein. The computer program product includes a computer-readable data storage medium. As defined herein, the term "computer-readable storage medium" means a storage medium that contains or stores program code for use by or in connection with an instruction execution system, apparatus, or device. As defined herein, a "computer-readable storage medium" is non-transitory and, as such, is not a transitory propagating signal per se. Examples of a computer-readable storage medium may include, but are not limited to, optical media, magnetic media, magneto-optical media, computer memory such as random access memory, a bulk storage device, e.g., hard disk, or the like.

The flowchart and block diagrams in the Figures illustrate the architecture, functionality, and operation of possible implementations of systems, methods and computer program products according to various aspects of the inventive arrangements disclosed herein. In this regard, each block in the flowchart or block diagrams may represent a module, segment, or portion of code, which includes one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In one aspect, the blocks in the flow chart illustration may be performed in increasing numeric order corresponding to the numerals in the various blocks. In other aspects, the blocks may be performed in an order that is different, or that varies, from the numerals in the blocks. For example, two or more blocks shown in succession may be executed substantially concurrently. In other cases, two or more blocks may sometimes be executed in the reverse order, depending upon the functionality involved. In still other cases, one or more blocks may be performed in varying order with the results being stored and utilized in subsequent or other blocks that do not immediately follow.

The terms "computer program," "software," "application," "computer-usable program code," "program code," "executable code," variants and/or combinations thereof, in the present context, mean any expression, in any language, code or notation, of a set of instructions intended to cause a data processing system to perform a particular function either directly or after either or both of the following: a) conversion to another language, code, or notation; b) reproduction in a different material form. For example, program code can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

Thus, throughout this disclosure, statements utilizing terms such as "processing" or "computing" or "calculating" or "determining" or "displaying" or the like, refer to the action and processes of a data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

The corresponding structures, materials, acts, and equivalents of all means or step plus function elements in the claims below are intended to include any structure, material, or act for performing the function in combination with other claimed elements as specifically claimed.

A method may include displaying, on a display device, an x-y coordinate system including an x-axis and a y-axis, wherein the x-axis is demarcated in units of time and the y-axis is demarcated according to a transaction characteristic, and formatting, using a processor, each of a plurality of transactions of a transaction system as a line having a start end representing a start of the transaction and a terminating end representing an end of the transaction. For each line representing a transaction, the start end of the line is located at a first x-coordinate corresponding to a start time of the transaction and a first y-coordinate of zero. For each line, the terminating end of the line is located at a second x-coordinate corresponding to an end time of the transaction and a second non-zero y-coordinate that is the same for each line. The method includes displaying, on the display device using the processor, each line in combination with the x-y coordinate system.

In one aspect, the slope of each line is correlated with duration of the transaction represented by the line.

Responsive to a first user input requesting additional transaction detail, the y-axis may be subdivided into a plurality of partitions corresponding to phases of the transactions and each line may be subdivided into a plurality of segments, wherein each phase of a transaction includes at least one segment.

A partition, or partitions, of the y-axis may be demarcated according to a transaction event.

A selected partition of the y-axis may be demarcated using a statistic calculated from a phase of each of the plurality of transactions corresponding to the selected partition.

In another aspect, a first segment of the y-axis may be demarcated according to a transaction event and a second segment of the y-axis may be demarcated using a statistic calculated from the phase of each of the plurality of transactions represented by the phase.

In still another aspect, the slope of a segment of a line may indicate complexity of the transaction system.

Responsive to a second user input, a selected segment of the y-axis may be hidden.

The method may also include scaling the zero y-coordinate away from the x-axis forming a partition between the x-axis and the zero y-coordinate, subdividing the y-axis into a plurality of partitions with each partition demarcated independently according to a transaction characteristic selected for a different segment of the plurality of transactions, and, for each transaction represented by a multi-segment line having a last segment with an end located at a y-coordinate less than a maximum y-coordinate, adding a vertical virtual segment extending the multi-segment line so that an end of the multi-segment line has a y-coordinate equal to the maximum y-coordinate.

A system includes a display device and a processor coupled to the display device. The processor is programmed to initiate executable operations. The executable operations include displaying, on the display device, an x-y coordinate system including an x-axis and a y-axis, wherein the x-axis is demarcated in units of time and the y-axis is demarcated according to a transaction characteristic, and formatting each of a plurality of transactions of a transaction system as a line having a start end representing a start of the transaction and a terminating end representing an end of the transaction. The executable operations include, for each line representing a transaction, locating the start end of the line at a first x-coordinate corresponding to a start time of the transaction and a first y-coordinate of zero, and, for each line, locating the terminating end of the line at a second x-coordinate corresponding to an end time of the transaction and a second non-zero y-coordinate that is the same for each line. The executable operations include displaying, on the display device, each line in combination with the x-y coordinate system.

In one aspect, the slope of each line is correlated with duration of the transaction represented by the line.

Responsive to a first user input requesting additional transaction detail, the executable operations include subdividing the y-axis into a plurality of partitions corresponding to phases of the transactions and subdividing each line into a plurality of segments, wherein each phase of a transaction includes at least one segment.

A partition, or partitions, of the y-axis may be demarcated according to a transaction event.

A selected partition of the y-axis may be demarcated using a statistic calculated from a phase of each of the plurality of transactions corresponding to the selected partition.

In another aspect, a first segment of the y-axis may be demarcated according to a transaction event and a second segment of the y-axis may be demarcated using a statistic calculated from the phase of each of the plurality of transactions represented by the phase.

In still another aspect, the slope of a segment of a line may indicate complexity of the transaction system.

Responsive to a second user input, the executable operations may include hiding a selected segment of the y-axis.

The executable operations may also include scaling the zero y-coordinate away from the x-axis forming a partition between the x-axis and the zero y-coordinate, subdividing the y-axis into a plurality of partitions with each partition demarcated independently according to a transaction characteristic selected for a different segment of the plurality of transactions, and, for each transaction represented by a multi-segment line having a last segment with an end located at a y-coordinate less than a maximum y-coordinate, adding a vertical virtual segment extending the multi-segment line so that an end of the multi-segment line has a y-coordinate equal to the maximum y-coordinate.

A non-transitory computer-readable medium has instructions stored thereon which, when executed by a processor, perform a method. The method includes displaying, on a display device, an x-y coordinate system including an x-axis and a y-axis, wherein the x-axis is demarcated in units of time and the y-axis is demarcated according to a transaction characteristic, and formatting each of a plurality of transactions of a transaction system as a line having a start end representing a start of the transaction and a terminating end representing an end of the transaction. The method includes, for each line representing a transaction, locating the start end of the line at a first x-coordinate corresponding to a start time of the transaction and a first y-coordinate of zero and, for each line, locating the terminating end of the line at a second x-coordinate corresponding to an end time of the transaction and a second non-zero y-coordinate that is the same for each line. The method further includes displaying, on the display device, each line in combination with the x-y coordinate system.

In one aspect, the slope of each line is correlated with duration of the transaction represented by the line.

The features described within this disclosure can be embodied in other forms without departing from the spirit or essential attributes thereof. Accordingly, reference should be made to the following claims, rather than to the foregoing disclosure, as indicating the scope of such features and implementations.

What is claimed is:

1. A method, comprising:
   displaying, on a display device, an x-y coordinate system comprising an x-axis and a y-axis, wherein the x-axis is demarcated in units of time and the y-axis is demarcated according to a transaction characteristic;
   formatting, using a processor, each of a plurality of transactions of a transaction system as a line having a start end representing a start of the transaction and a terminating end representing an end of the transaction, wherein the transactions are for a data processing system and obtained from a transaction data structure stored in a memory;
   for each line representing a transaction, locating the start end of the line at a first x-coordinate corresponding to a start time of the transaction and a first y-coordinate of zero;
   for each line, locating the terminating end of the line at a second and different x-coordinate corresponding to an end time of the transaction and a second non-zero y-coordinate that is the same for each line, wherein slope of each line is non-zero and correlates with duration of the transaction represented by the line; and
   displaying, on the display device using the processor, each line in combination with the x-y coordinate system; and
   generating a visualization with a first transaction that begins prior to a second transaction and that ends after the second transaction as overlapping ones of the lines.

2. The method of claim 1, further comprising:
   subdividing each line representing a transaction having a plurality of phases into a plurality of linear segments, wherein each phase of a transaction comprises at least one segment.

3. The method of claim 2, further comprising:
   subdividing the y-axis into a plurality of partitions, wherein each partition corresponds to a different phase of the transactions and wherein partitions of the y-axis are demarcated according to transaction events detected within the transaction data.

4. The method of claim 2, wherein a selected partition of the y-axis is demarcated using a statistic calculated from a phase of each of the plurality of transactions corresponding to the selected partition.

5. The method of claim 2, wherein:
   a first segment of the y-axis is demarcated according to a transaction event; and
   a second segment of the y-axis is demarcated using a statistic calculated from the phase of each of the plurality of transactions represented by the phase.

6. The method of claim 2, wherein slope of a segment of a line indicates complexity of the transaction system.

7. The method of claim 2, further comprising:
   responsive to a user input, hiding a selected segment of the y-axis.

8. The method of claim 1, further comprising:
   scaling the zero y-coordinate away from the x-axis forming a partition or between the x-axis and the zero y-coordinate;
   subdividing the y-axis into a plurality of partitions with each partition demarcated independently according to a transaction characteristic selected for a different segment of the plurality of transactions; and
   for each transaction represented by a multi-segment line having a last segment with an end located at a y-coordinate less than a maximum y-coordinate, adding a vertical virtual segment extending the multi-segment line so that an end of the multi-segment line has a y-coordinate equal to the maximum y-coordinate.

9. A system, comprising:
a display device;
a processor coupled to the display device and programmed to initiate executable operations comprising:
displaying, on the display device, an x-y coordinate system comprising an x-axis and a y-axis, wherein the x-axis is demarcated in units of time and the y-axis is demarcated according to a transaction characteristic;
formatting each of a plurality of transactions of a transaction system as a line having a start end representing a start of the transaction and a terminating end representing an end of the transaction, wherein the transactions are for a data processing system and obtained from a transaction data structure stored in a memory;
for each line representing a transaction, locating the start end of the line at a first x-coordinate corresponding to a start time of the transaction and a first y-coordinate of zero;
for each line, locating the terminating end of the line at a second and different x-coordinate corresponding to an end time of the transaction and a second non-zero y-coordinate that is the same for each line, wherein slope of each line is non-zero and correlates with duration of the transaction represented by the line;
displaying on the display device each line in combination with the x-y coordinate system; and
wherein the processor is further programmed to initiate executable operations comprising: generating a visualization with a first transaction that begins prior to a second transaction and that ends after the second transaction as overlapping ones of the lines.

10. The system of claim 9, wherein the processor is further programmed to initiate executable operations comprising:
responsive to a first user input requesting additional transaction detail, subdividing each line representing a transaction having a plurality of phases into a plurality of linear segments, wherein each phase of a transaction comprises at least one segment.

11. The system of claim 10, wherein the processor is further programmed to initiate executable operations comprising:
subdividing the y-axis into a plurality of partitions, wherein each partition corresponds to a different phase of the transactions and wherein partitions of the y-axis are demarcated according to transaction events detected within the transaction data.

12. The system of claim 10, wherein a selected partition of the y-axis is demarcated using a statistic calculated from a phase of each of the plurality of transactions corresponding to the selected partition.

13. The system of claim 10, wherein:
a first segment of the y-axis is demarcated according to a transaction event; and
a second segment of the y-axis is demarcated using a statistic calculated from the phase of each of the plurality of transactions represented by the phase.

14. The system of claim 10, wherein slope of a segment of a line indicates complexity of the transaction system.

15. The system of claim 10, wherein the processor is further programmed to initiate executable operations comprising:
responsive to a second user input, hiding a selected segment of the y-axis.

16. The system of claim 10, wherein the processor is further programmed to initiate executable operations comprising:
scaling the zero y-coordinate away from the x-axis forming a partition or between the x-axis and the zero y-coordinate;
subdividing the y-axis into a plurality of partitions with each partition demarcated independently according to a transaction characteristic selected for a different segment of the plurality of transactions; and
for each transaction represented by a multi-segment line having a last segment with an end located at a y-coordinate less than a maximum y-coordinate, adding a vertical virtual segment extending the multi-segment line so that an end of the multi-segment line has a y-coordinate equal to the maximum y-coordinate.

17. A non-transitory computer-readable medium having instructions stored thereon which, when executed by a processor, perform a method comprising:
displaying, on a display device, an x-y coordinate system comprising an x-axis and a y-axis, wherein the x-axis is demarcated in units of time and the y-axis is demarcated according to a transaction characteristic;
formatting each of a plurality of transactions of a transaction system as a line having a start end representing a start of the transaction and a terminating end representing an end of the transaction, wherein the transactions are for a data processing system and obtained from a transaction data structure stored in a memory;
for each line representing a transaction, locating the start end of the line at a first x-coordinate corresponding to a start time of the transaction and a first y-coordinate of zero;
for each line, locating the terminating end of the line at a second and different x-coordinate corresponding to an end time of the transaction and a second non-zero y-coordinate that is the same for each line, wherein slope of each line is non-zero and correlates with duration of the transaction represented by the line;
displaying, on the display device, each line in combination with the x-y coordinate system; and
responsive to a first user input requesting additional transaction detail, subdividing the y-axis into a plurality of partitions corresponding to phases of the transactions and subdividing each line representing a transaction into a plurality of linear segments, wherein each phase of a transaction comprises at least one segment.

* * * * *